United States Patent [19]

Woodward

[11] Patent Number: 5,723,783

[45] Date of Patent: Mar. 3, 1998

[54] ACOUSTIC DISPLACEMENT FLOWMETER

[75] Inventor: William Stephen Woodward, Chapel Hill, N.C.

[73] Assignee: J & W Scientific, Incorporated, Folsom, Calif.

[21] Appl. No.: 213,605

[22] Filed: Mar. 15, 1994

[51] Int. Cl.⁶ ........................................................ G01F 5/00
[52] U.S. Cl. ............................................................ 73/203
[58] Field of Search ........................................ 73/203, 204

[56] References Cited

U.S. PATENT DOCUMENTS

| | | | |
|---|---|---|---|
| 4,373,549 | 2/1983 | Nalepa et al. | 137/487.5 |
| 4,475,388 | 10/1984 | Kawai et al. | 73/204 |
| 4,504,922 | 3/1985 | Johnson et al. | 364/557 |
| 4,961,348 | 10/1990 | Bonne | 73/861.02 |
| 5,460,038 | 10/1995 | Woodward | 73/203 |

*Primary Examiner*—George M. Dombroske
*Assistant Examiner*—Jewel Artis
*Attorney, Agent, or Firm*—Graham & James LLP

[57] ABSTRACT

An acoustic displacement flowmeter determines the flow rate of a fluid in a path containing a controllable valve by establishing fluid flow along the path, directing the flow of the fluid to a transducer having a displacement element by restricting the flow path, generating a signal from the transducer representative of displacement due to fluid flow while the flow path is restricted, using the transducer to determine the fluid flow rate, and reestablishing fluid flow along the path by removing the restriction. The transducer signal is used to determine the fluid flow rate by providing an analog reference signal, integrating the analog reference signal for a predetermined time period, deintegrating the integrated reference signal with the transducer signal until the value of the deintegration signal reaches a threshold value, and using the time required for the deintegration signal to reach the threshold value to calculate the flow rate. The time is accumulated by counting the number N of fundamental sampling periods occurring during the deintegration of the integrated reference signal and determining the flow rate from the equation V=A/N−B, where V is the mass flow rate and A and B are constants.

A temperature correction signal for adjusting the calculated flow rate value for temperature variations is generated by providing first and second sensor signals whose ratio is representative of temperature, integrating the first sensor signal for a predetermined time period, deintegrating the integrated first signal with the second sensor signal until the value of the deintegration signal reaches zero, and using the time required for the deintegration sensor signal to reach zero to calculate the temperature correction signal.

14 Claims, 7 Drawing Sheets

FLOWMETER TIMING DIAGRAM
FIG. 3.

ACOUSTIC DISPLACEMENT FLOWMETER

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

This invention relates to fluid flow measuring devices. More specifically, this invention relates to fluid flow measuring devices for providing electrical signals representative of fluid flow.

Many techniques exist in the prior art for the electronic measurement of fluid flow. Typically, such techniques require prior knowledge of the physical properties of the fluid to be measured so that the measuring instrument can be calibrated. Typical examples of such physical parameters are the specific heat capacity, compressibility, density, viscosity, and thermal conductivity of the fluid. Many of these physical parameters are themselves dependent upon the composition of the fluid. For applications in which the fluid composition is unknown or variable in an unpredictable way, such techniques are both inaccurate and unsuitable.

Additional disadvantages inherent in many prior art techniques include limitations in the range of flow rates over which accurate measurements can be reliably made, sometimes termed the "turndown ratio", and the generation of unacceptable back pressure in the fluid path when the flowmeter is connected and operational.

In an attempt to overcome the above-noted shortcomings of the prior art, flowmeters have been developed which are less sensitive to fluid physical parameters. One such class of flowmeter is generally termed a positive displacement type flowmeter. In a positive displacement flowmeter, the fluid whose flow is to be measured is periodically accumulated in a separate confining chamber, such as a cylinder with a tight fitting piston, whose volume increases at a rate equal to the flow of the fluid (e.g., by displacement of the piston). By measuring the rate of increase of the confined volume (e.g., by generating a signal representative of the amount of displacement of the piston), the fluid flow rate may be computed. While specific flowmeter details (such as the manner of defining the confined volume and the technique for transducing the rate of volume change) differ depending on the style and application of a given positive displacement flowmeter, all such flowmeters possess the desirable property of reasonable accuracy in the fluid flow measurement independent of the physical parameters of the fluid being measured. However, a severe disadvantage in most known positive displacement flowmeters is the disturbance in the fluid flow caused by the necessity of displacing the movable surface of the confining chamber in order to generate the measurement signal. This introduces back pressure characteristics which render such flowmeters unsuitable for use in any application sensitive to the periodic introduction of fluid flow back pressure.

One positive displacement type gas flowmeter which has been developed to reduce the adverse back pressure effect is the soap-film type of positive displacement flowmeter. In this type of flowmeter, the confined volume is defined by a smooth-walled cylindrical tube typically fabricated from transparent glass. The tube has an inlet end connected to the gas whose flow is to be measured and an outlet end open to ambient. Adjacent the inlet end is an arrangement for introducing a soap film to be swept along the inner volume of the tube by the advancing gas flow. Optical sensors arranged at predetermined locations along the tube measure the transit time of the soap film translated along the interior of the tube, and this time value is converted to a fluid flow rate using a known algorithm. Due to the fact that only the relatively small forces of viscosity and surface tension effects oppose the motion of the soap film and thus the flow of the gas stream, the back pressures generated by this type of flowmeter are generally sufficiently low to be acceptable. In addition, the soap film flowmeter has a dynamic measurement range which is substantially broader than that of other positive displacement flowmeters (typically in the range from about 0.5 to about 500 Ml/min.). Also, this type of flowmeter is relatively inexpensive to manufacture and maintain. The major disadvantage of the soap film flowmeter is the requirement that soap film must be periodically generated, introduced into the fluid stream and somehow exhausted. Generation of the soap film is typically performed by means of a manually operated bubble generating device, which requires the presence of a human operator and prevents automatic or unattended operation. Also, due to the fact that the wet film is introduced into the gas stream, the stream is contaminated with water vapor, which is unsuited for many in-line applications involving gases. In addition, the soap film type flowmeter is entirely unsuited for any flowmeter applications involving liquids.

An improvement over the film flowmeter described above is disclosed in co-pending, commonly assigned U.S. patent application Ser. No. 07/827,176, filed Jan. 28, 1992, entitled ACOUSTIC DISPLACEMENT FLOWMETER, now U.S. Pat. No. 5,460,038 issued Oct. 24, 1995, the disclosure of which is hereby incorporated by reference. In the referenced application, a positive displacement type flowmeter is disclosed which requires no advance knowledge of the physical parameters of the fluids, which introduces no substantial back pressure in the fluid flow path, which introduces no contamination in the fluid path, possesses a wide dynamic range of measurable flow rates, which is compatible with a wide variety of gas and liquid fluid flow applications, and is capable of fully automatic operation. The positive displacement flowmeter comprises a high compliance acoustic type displacement transducer having a displacement element, the transducer including a fluid port for coupling to a fluid path, and a signal output for manifesting a signal representative of movement of the displacement element due to the ingress of fluid through the port; and means having an input coupled to the displacement transducer signal output for computing the average value of the fluid flow rate over a measurement period. The computing means includes means for generating a control signal for enabling a controllable valve located in the fluid path to divert fluid into the transducer fluid port, means responsive to the generation of the control signal for masking an initial portion of the transducer output signal, means for integrating the transducer output signal after the initial portion, means for sampling the values of the integrating means, means for summing the sample values, and means for terminating the control signal when one of the following conditions occurs: (a) the magnitude of the sample value reaches a predetermined maximum value; or (b) the measurement period reaches a predetermined maximum value. The computing means determines the value of the fluid flow rate from the equation $F=2S/[bn(n+1)]$, where F is the determined flow rate, S is the totalized value of the summed samples, n is the number of samples obtained, and b is a predetermined calibration constant. The masking means preferably includes means for determining the length T of the initial portion to be masked using the algorithm:

if $F$ is $\geq K$, then $T=0$ if $F$ is $<K$, then $T=A[(K-f)/K]$.

where F is the fluid flow rate determined from a previous measurement, K is a preselected constant flow rate value lying within the desired range of values to be measured, and A is a preselected constant time duration. The computing means also optionally includes a manually operable switch for initiating a flowmeter operation, a timer for terminating operation of the flowmeter after the lapse of a predetermined time period, and means for extending operation of the flowmeter whenever a sampling means indicates that the manually operable switch means was activated before the lapse of the predetermined time period.

During operation of the acoustic displacement flowmeter, fluid flow is first established along a fluid path, after which the flow of the fluid is directed to the transducer having the displacement element by restricting the flow path, thereby directing the flow of the fluid to the transducer, by operating a valve in the flow path to provide a temporary flow path restriction. The signal generated from the transducer, which is representative of displacement due to fluid flow while the path is restricted, is used to determine the fluid flow rate by integrating the signal over a measurement period, sampling the value of the integrated signal, summing the sample values, and determining the flow rate from the equation noted above for F. After the flow rate has been determined from the equation, the fluid flow along the path is reestablished by operating the valve to remove the flow path restriction when the magnitude of the interval of the flow rate signal reaches a predetermined maximum value or when the measurement period reaches a predetermined maximum value.

While the above described acoustic displacement flowmeter has been found to function in an effective manner for many applications, the device is limited to measuring flow in one direction only. Thus, in those applications where it is desirable to measure flow in a forward and reverse direction, the meter must be disconnected from the flow path and the flow path connections reversed, which is undesirable in that it introduces downtime delays. In addition, the acoustic displacement flowmeter is not designed to take into effect inconsistencies in the relationship between actual flow and flow measurement as the flow rate varies over an extremely wide range. In addition, the acoustic displacement flowmeter is not designed to account for variations in the volume of gas whose flow is being measured due to changes in absolute temperature and absolute pressure. Lastly, the initial calibration process required for the acoustic displacement flowmeter is relatively labor intensive, requiring a testing procedure involving reference to flow standards of known accuracy before the instrument can be deemed sufficiently reliable.

Efforts to date to design an acoustic displacement flowmeter devoid of the above disadvantages have not met with success to date.

SUMMARY OF THE INVENTION

The invention comprises a method and apparatus for measurement of a bidirectional gas flow which is independent of gas composition and, optionally, ambient temperature and atmospheric pressure. In addition, the invention provides an even wider dynamic range conversion of the flow rate signal than in the previous acoustic displacement flowmeter. The invention further includes a technique for automatic calibration of the flow measurement apparatus during manufacture that compensates for both production variables and flow transducer non-linearities.

From a process standpoint, the invention comprises an improvement over the method of determining the flow path rate of a fluid flowing along a path, the method comprising the steps of (a) establishing fluid flow along the path; (b) directing the flow of fluid between the path and a transducer having a displacement element by restricting the flow path; (c) generating a signal from the transducer representative of displacement due to fluid flow while the flow path is restricted; (d) using the transducer signal to determine the flow rate; and (e) reestablishing fluid flow along the path by removing the restriction. The improvement comprises the modification to the step (d) of using which includes the steps of (i) providing an analog reference signal; (ii) integrating the analog reference signal for a predetermined time period; (iii) deintegrating the integrated reference signal with the transducer signal until the value of the integrated reference signal reaches a threshold value; and (iv) using the time required for the integrated reference signal to reach the threshold value to calculate the flow rate. The step (iv) of using includes the steps of accumulating the time by counting the number N of fundamental sampling periods occurring during the step (iii) of deintegrating, and determining the flow rate from the equation:

$$V=A/N-B,$$

where V is the volumetric flow rate and A and B are constants.

The improved method further includes the step of providing a temperature correction signal for adjusting the calculated flow rate value, including the steps of generating first and second sensor signals whose ratio is representative of temperature, integrating the first sensor signal for a second predetermined time period, deintegrating the integrated first signal with the second signal until the value of the integrated first signal reaches a second threshold value, and using the time required for the integrated first signal to reach the second threshold value to calculate the temperature correction signal. The value of both the first and second threshold value is preferably zero.

From an apparatus standpoint, the invention comprises an acoustic displacement flow meter for determining the flow rate of a fluid in a path containing a controllable valve, the flow meter comprising a displacement transducer having a fluid port adapted to be coupled to said fluid path, a displacement element, and a signal output for manifesting a signal representative of movement of the displacement element due to the movement of fluid through said port; and means having an input coupled to the displacement transducer signal output for computing the value of the fluid flow rate, the computing means including means for generating a control signal for enabling the controllable valve to divert fluid between the path and the fluid port, means for providing an analog reference signal, means for integrating the analog reference signal for a predetermined time period, means for deintegrating the integrated reference signal with the transducer signal until the value of the integrated reference signal reaches a threshold value, means for counting the time required for the integrated reference signal to reach the threshold value, means for calculating the flow rate from the counted time, and means for terminating the control signal after a predetermined measurement period.

The computing means further preferably includes means for calculating a temperature control signal for adjusting the calculated fluid flow rate, the temperature correction signal calculating means including sensor means for providing first and second sensor signals whose ratio is representative of temperature, means for coupling the first sensor signal to the integrating means for a second predetermined time period, means for coupling the second sensor signal to the deintegrating means until the value of the integrated first signal reaches a second threshold value, means for counting the time required for the integrated first signal to reach the second threshold value, and means for calculating the temperature correction signal from the count achieved by the counting means.

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
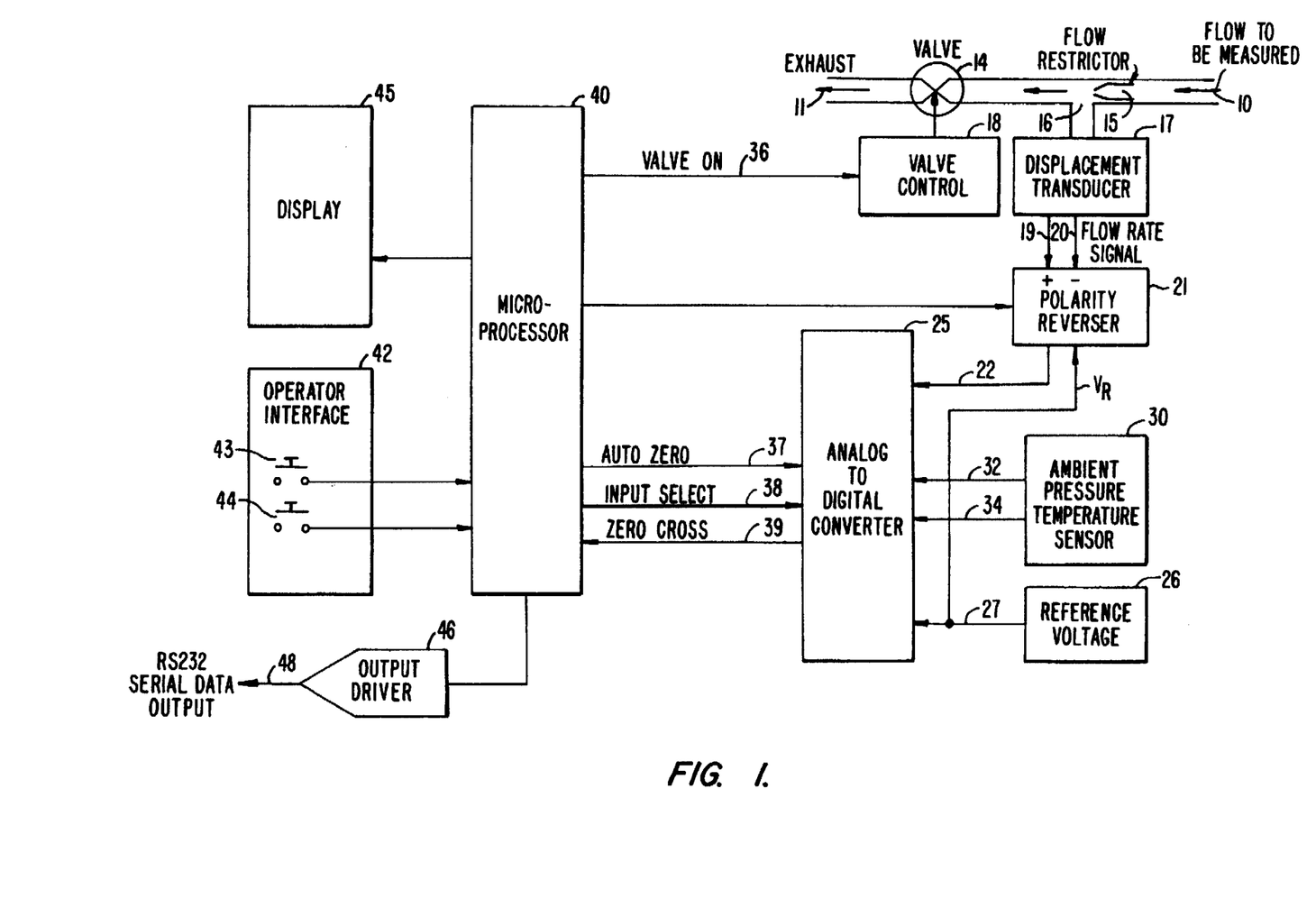
FIG. 1 is a block diagram showing the preferred embodiment of the invention.

Turning now to the drawings, FIG. 1 is a schematic block diagram illustrating the major units comprising the preferred embodiment of the invention. As seen in this figure, a portion of the fluid path includes an inlet 10 into which a fluid, usually gas, is introduced and a flow outlet 11 which is coupled to the downstream portion of the fluid flow path. An electrically operable flow restricting valve 14 is positioned upstream of the outlet 11 and downstream of the inlet 10. A flow restrictor 15 is included in the inlet portion of the flow path just upstream of a branch 16, for a purpose to be described. The branched portion of the fluid flow path is coupled to the inlet port of a displacement transducer 17.

Figure 3:
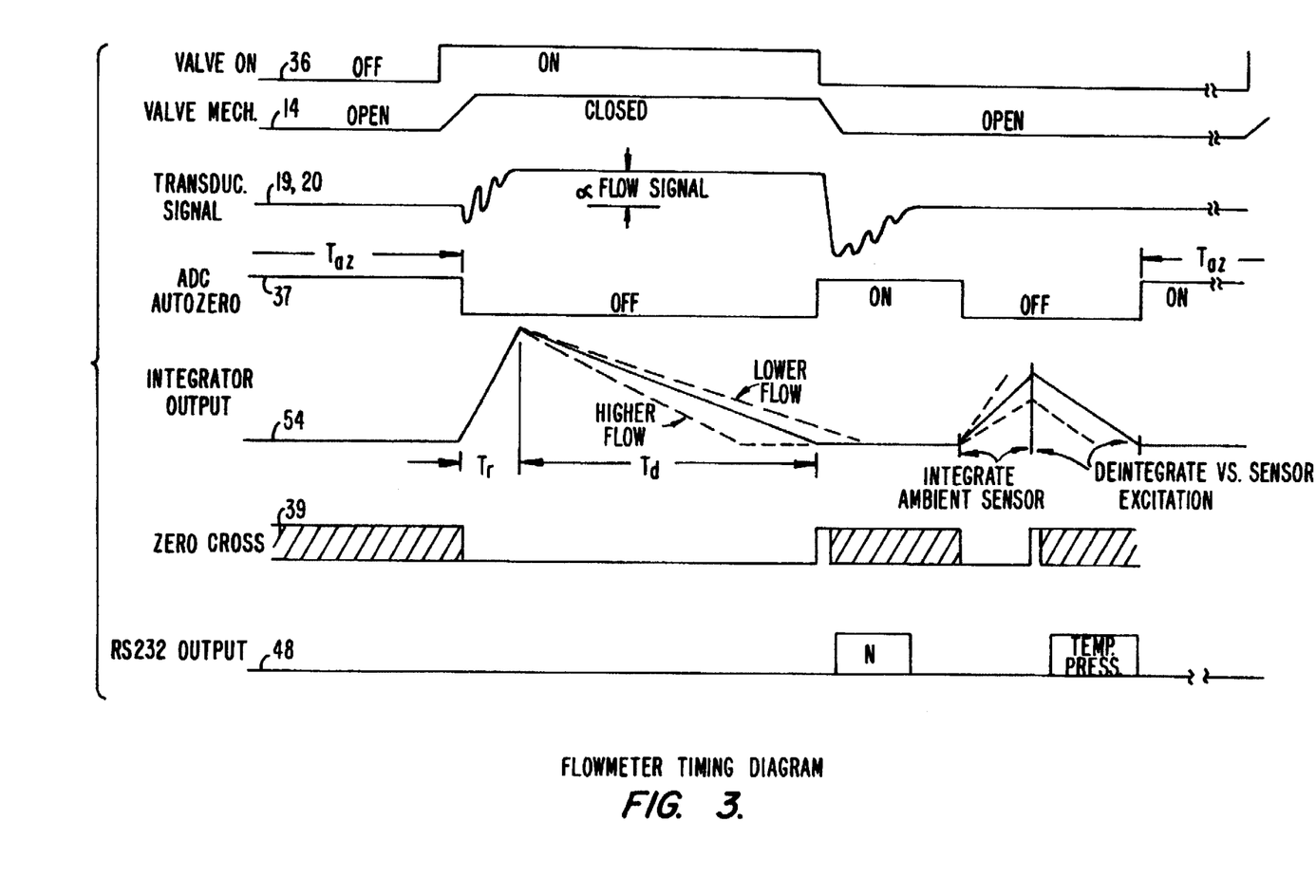
FIG. 3 is a timing diagram illustrating the operation of the embodiment of FIGS. 1 and 2.

Flow restriction valve 14 is preferably a normally open, electrically operable valve, such as a type LFDX0510250A valve available from the Lee Company of Westbrook, Conn. This valve is controlled by a valve control unit 18 which receives a control signal termed VALVE ON from a microcomputer unit 40. Valve 14 is operated to the closed state by valve control unit 18 whenever the VALVE ON signal, depicted in FIG. 3, is in the active state.

Displacement transducer 17 preferably comprises a high compliance acoustic type displacement transducer, such as a type 25ST500 transducer available from Mouser Electronics Co. of Randolf, N.J. Transducer 17 includes a Mylar diaphragm element and is mounted so that gas is introduced into a chamber bounded by the diaphragm and a rigid plate. Transducer 17 generates an electrical signal representative of displacement on a pair of output leads 19, 20 which are coupled to a polarity reverser circuit 21 illustrated in detail in FIG. 4. The polarity reverser circuit is capable of reversing the polarity of the signals, depending upon the direction of flow, so that the signal resulting from flow along the flow path in either direction can be correctly processed by an analog to digital converter 25 to which the polarity reverser circuit 21 is coupled via lead 22. A reference voltage generator 26 supplies a reference voltage Vr on conductor 27 to the polarity reverser circuit 21 and also to analog to digital converter 25.

An ambient pressure/temperature sensor 30 provides a pair of signals related to a measured value of the ambient pressure and temperature on conductors 32 and 34 to analog to digital converter 25. The two signals supplied by sensor 30 are designated "AMBIENT SENSOR" and "AMBIENT EXCITATION", respectively. Ambient sensor 30 preferably comprises a type FPM-05PG sensor available from Fujikura Ltd. of Tokyo, Japan, which consists essentially of a piezoresistive gauge pressure sensor connected to a small air reservoir. The sensor is modified by sealing the inlet port to create a sealed internal air reservoir. This device produces the two electrical signals AMBIENT SENSOR and AMBIENT EXCITATION, the ratio between which is representative of the pressure differential between the flowmeter ambient atmosphere and the pressure of the air sample trapped in the sealed sensor reservoir.

A pair of control signals termed "AUTO ZERO" and "INPUT SELECT" are supplied to analog to digital converter 25 via leads 37, 38 from microcomputer 40. The output of analog to digital converter 25, termed "ZERO CROSS" is supplied to microcomputer 40 as a raw data signal on conductor 39. An operator interface 42 is provided with a pair of manually operable switches 43, 44, which enable an operator to commence flowmeter operation by manipulating switch 43, and which enable an operator to suspend flow measurements and cause display of a prompting message on a display 45 indicating the current mode of flowmeter operation (volumetric, mass flow, linear velocity, etc.) by operating switch 44. Subsequent operation of switch 44 causes display of the next entry in the list of available modes.

Microcomputer 40 comprises a type Z84C0004PEC microprocessor available from Zilog, Inc. of Campbell, Calif.

Display 45 preferably comprises a type AND671display available from AND of Burlingame, Calif.

One of the output ports of microcomputer 40 is coupled to an output driver 46 which provides RS232-type serial data output on terminal 48.

In operation, the flow to be measured is applied to the flow path and diverted to displacement transducer 17 by closure of valve 14 in response to a control signal generated by valve control unit 18 in response to the receipt of a VALVE ON signal from microcomputer 40. Flow restrictor 15 functions to reduce or eliminate undesirable pressurization which can appear at high flow rates at the input to the displacement transducer due to various sources of resistance to gas flow in the flow path. When the flow is diverted into the volume confined by the transducer diaphragm, gas so accumulated displaces the diaphragm and produces an electrical signal on terminals 19, 20 proportional to the rate of accumulation and, consequently, to volumetric flow.

Polarity reversing circuit 20 adjusts the polarity of the displacement signal on conductors 19, 22 in response to a control signal from microcomputer 40 so as to provide an analog signal of proper polarity for analog to digital converter 25.

Figure 2:
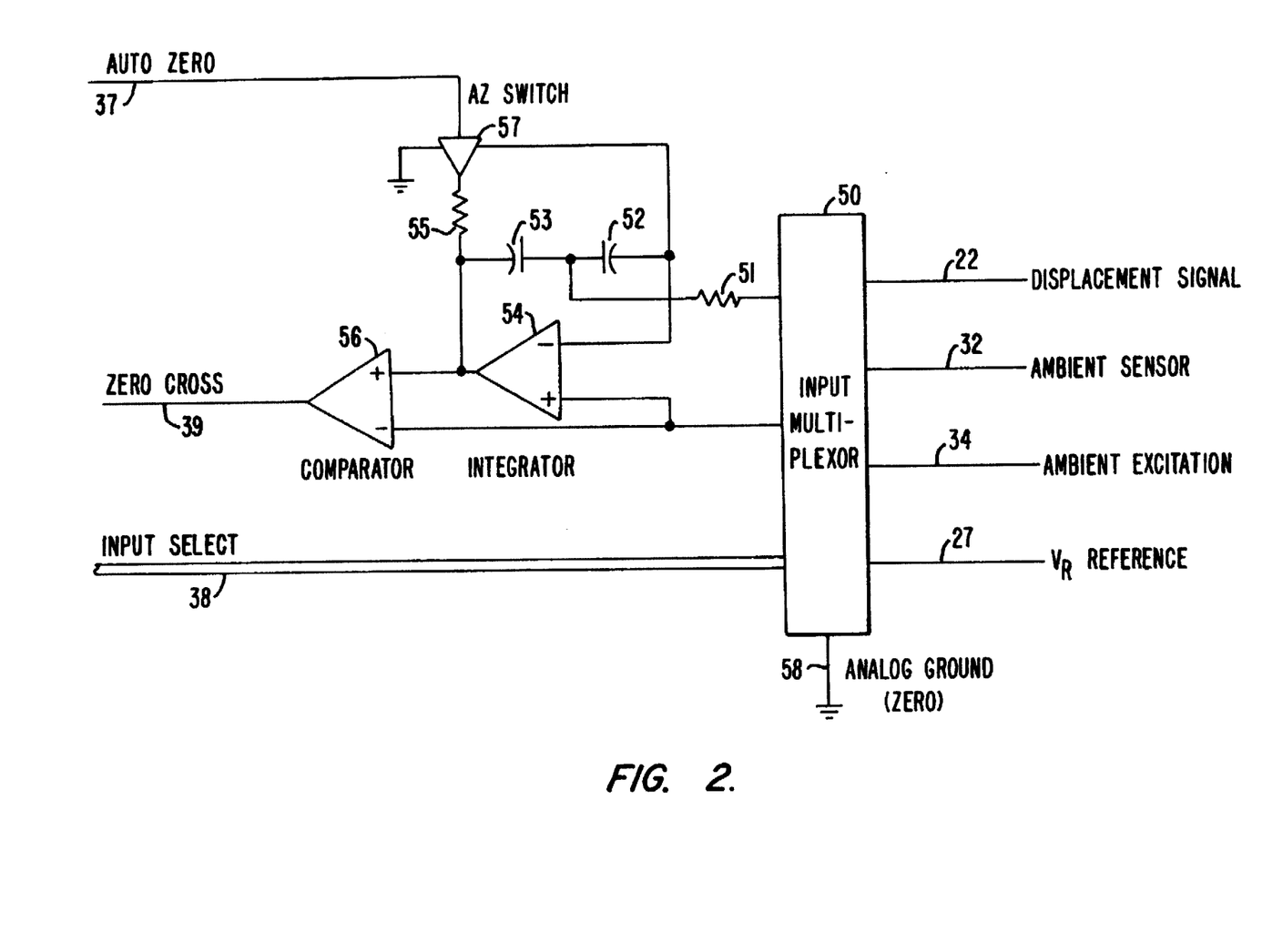
FIG. 2 is a partial schematic illustrating the analog to digital converter of the preferred embodiment.

With reference to FIG. 2, analog to digital converter 25 includes an input multiplexer 50 having five different input terminals for receiving the Vr reference signal on conductor 27, the two signals from ambient sensor 30 on conductors 32, 34, the displacement signal from polarity reverser 21 on conductor 22 and an analog ground reference on conductor 58. Input multiplexer 50 is controlled by input select signals coupled from microcomputer 40 on input select lines 38.

Converter 25 further includes an input resistor 51, an auto zero storage capacitor 52, an integrator capacitor 53, an integrating amplifier 54, a current limiting resistor 55, an operational amplifier 56 configured as a comparator, and an auto zero switch 57. Amplifiers 54, 56 comprise one-half of a type TLC27M4 quad operational amplifier circuit available from Texas Instruments of Dallas, Tex. Auto zero switch 57 comprises a portion of a type CD4053 CMOS multiplexer available from National Semiconductor of Santa Clara, Calif. Analog to digital converter 25 functions in the following fashion.

With reference to FIG. 3, microcomputer 40 initially issues a VALVE ON command, followed by an AUTO ZERO command which causes the auto zero switch 57 to close. This couples the output of integrator amplifier 54 to the auto zero storage capacitor 52 through current limiting resistor 55. The voltage which subsequently accumulates on capacitor 52 serves to null any offset error of the integrator. This initial phase is termed the "auto zero phase". The second phase, termed the "reference integration phase", begins when the auto zero control signal on conductor 37 is deasserted, which deactivates the auto zero switch 57. At the same time, microcomputer 40 provides input select signals on conductors 38 which configure the input multiplexer 50 to connect the analog ground signal to the tied inputs of amplifier 54 and comparator 56. Also, the reference voltage Vr is coupled to the integrator for a preselected period of time Tr. During this time, a charge accumulates on integrator capacitor 53 which is equal to the product of Tr times the reference voltage Vo divided by the values of integrator capacitor 53 and input resistor 51. At the end of Tr, the third phase— termed the deintegration phase— begins by deselecting the Vr reference input to multiplexer 50, and selecting the displacement signal input on conductor 22. Because the polarity reverser circuit 21 ensures that the polarity of the displacement signal as presented to converter 25 is always in opposition to the reference voltage Vr, the charge on integrator capacitor 53 now begins to diminish at a rate proportional to the magnitude of the signal from displacement transducer 17 and, consequently, to the flow rate under measurement. The time required for this charge to diminish to zero (Td) is proportional to the transducer signal:

$$Td=Tr \cdot Vr/(Sf+Vo)$$

where

Td=deintegration time

Tr=reference integration time

Vr=reference voltage

Sf=flow rate signal magnitude

Vo=small bias voltage to limit maximum conversion time
During Td, microcomputer 40 samples the level of the zero cross signal present on conductor 39 produced by comparator 56 at a frequency F limited by the internal instruction execution speed of the microcomputer 40. The final digital conversion result N is given by:

$$N=F \cdot Tr \cdot Vr/(Sf+Vo)$$

The number of samples N is accumulated in a register in the microcomputer 40 until such time as the zero cross signal transitions to the opposite state. This provides the measured value of the flow rate uncorrected for any deviations from standard temperature and pressure conditions.

In order to correct for any deviations from standard temperature and pressure conditions, after the flow rate sampling cycle is complete, the signals from sensor 30 are evaluated in a similar fashion using the three-phase conversion algorithm described above, modified as follows. During phase 1, the converter 25 is operated in the auto zero phase. During phase 2, the AMBIENT SENSOR output signal on conductor 32 is selected for integration for a predetermined time period. Finally, during phase 3, the charge accumulated on capacitor 53 during phase 2 is deintegrated at a rate proportional to the value of the AMBIENT EXCITATION sensor signal present on conductor 34. Since the sensor 30 is of a type in which the output ambient sensor signal on conductor 32 is proportional to the excitation current supplied to the sensor, the analog to digital conversion of the sensor output is performed in a fashion which inherently produces a numeric result equal to the ratio of sensor output to sensor excitation. Since the deintegration of the accumulated charge on capacitor 53 occurs at a rate directly proportional to the sensor excitation, the time required to complete the deintegration is inversely proportional to the excitation.

The measured value of ambient pressure from sensor 30 is used to convert the volume flow measurement via the following relationship:

$$Fm=Fv \cdot Pa/Ta$$

where

Fm=mass flow

Fv=volumetric flow

Pa=ambient pressure (in atmospheres)

Ta=ambient absolute temperature (in units of degree K/293, i.e., the ratio of ambient temperature to standard temperature) Consider the pressure difference between the contents of a sealed rigid container of a gas and surrounding ambient. If a gas in a container was at standard temperature and pressure when the container was sealed, then the pressure differential in atmospheres is:

$$pd=Pa-Ta$$

where

Pa=ambient pressure

Ta=ambient temperature (expressed in the units noted above) A good approximation of mass flow Fm can be stated as:

$$Fm=Fv \cdot (1+pd)=Fv \cdot (1+Pa-Ta)$$

In fact, the resulting correction is exact for variations in pressure, but is only approximate for temperature variations. However, the contribution of temperature variations is relatively small, on the order of 1% over a temperature range from about −10° C. to about +50° C. In particular, assume an ambient pressure Pa of 1 atmosphere. The ratio of the exact relationship Fm=Fv·Pa/Ta to the approximate relationship Fm=Fv·(1+Pa−Ta) is:

$$(1/Ta)/(1+Pa-Ta)=1/(2 \cdot Ta-Ta^2)$$

For this ratio to differ from 1.0 by more than 1%, Ta must differ from 1 (equivalent to a temperature of 293° Kelvin) by more than 10% (equivalent to 29° C).

As noted above, a flow restrictor 15 is included upstream of the branch 16 in the fluid path. Flow restrictor 15 produces an extractor effect for substantially reducing or entirely eliminating undesirable pressurization at high input flow rates caused by various sources of resistance to gas flow which inevitably exist in the flow path.

It should be noted that flow restrictor 15 does not significantly change the net flow through the system because the pressure drop introduced by restrictor 15 is extremely low in absolute terms (substantially less than 1 psi), and because no alternate flow path exists in the meter through which gas might be diverted.

The specific reasons for employing restrictor 15 are as follows. It has been observed that a significant static pressure (relative to the extremely high compliance of transducer 17) is produced at high flow rates from flow resistance incurred by elements of the flow path while the valve 14 is open and the gas is intended to exhaust freely. This static pressure tends to displace the diaphragm of displacement transducer 17 from the zero flow rest position to some other position. This adversely affects the quantitative response of the diaphragm during subsequent flow measurement cycles. The magnitude of the static pressure and, therefore, the transducer perturbation, is dependent upon gas stream density.

The selection of the location of flow restrictor 15 can best be determined empirically, and installation of the restrictor 15 has been found to substantially eliminate the static pressure effect. While not known exactly, it is likely that this improvement is due to an "extractor" or venturi effect caused by a depression of flow stream dynamic pressure due to the local increase in fluid velocity at the point of flow stream constriction as described in standard models of fluid flow (e.g. Bernoulli effect). This depression of dynamic flow pressure acts to cancel the static pressurization of the inlet of the displacement transducer 17 and therefore eliminates the undesirable dependence of flow measurement upon gas composition.

Satisfactory dimensions for the restrictor 15 have been empirically determined to be relatively uncritical, because the original pressurization inaccuracy caused only small errors on the order of plus or minus 5%. In a flow path having a simple plastic ⅛ inch ID T fitting arranged as shown in FIG. 1, flow restrictor 15 is implemented as a short length (on the order of 1 cm) of 1/32 inch ID tubing pressed into the inlet stub of the T fitting.

As noted above, the polarity reverser circuit 21 functions to reverse the polarity of the displacement transducer 17 output signals, depending upon the direction of flow, so that the signal resulting from flow along the fluid path in either direction can be correctly processed by analog to digital converter 25. The manner in which the signal polarity is tested and reversed, if necessary, is as follows. During the deintegration of the signal from transducer 17 during phase 3 of the measurement cycle, microcomputer 40 measures the time required for the zero cross signal on conductor 39 to change state. If this time exceeds a predetermined limit, corresponding to about minus 15 ml/min in the preferred embodiment, the flowmeter software determines that the actual flow direction is opposite to the one appropriate to the current setting of the state of the polarity reverser 21. As a consequence, microcomputer 40 will generate a signal inverting the state of the reverser circuit 21, and will disregard the current measurement. Thereafter, subsequent flow measurements occur with the correct reverser setting. As a manual override, the operator can override the current setting of the reverser circuit 21 by manipulating one of the switches 43, 44 in the operator interface 42 in response to prompting of display 45 by microcomputer 40.

The dynamic range of the flow rate signal processing is designed to be large enough to accommodate manufacturing tolerances of plus or minus 20% of the flowmeter components, due predominantly to variations in the sensitivity of displacement transducer 17. A 1% resolution of a 1000 to 1 desired ratio of maximum (1 L/min) to minimum (1 ml/min) flow rates is provided by analog to digital converter 25. Thus, the dynamic range of the flow rate signal processing path is large enough to accommodate transducer response range when convolved with the dynamic range of the flow rate signal itself. This requirement imposes a factor of 1.44 increase in dynamic range needed by the signal processing path. That is, analog to digital converter 25 must be sufficiently sensitive to resolve the 1/1.2=0.833 . . . response of flow meters falling to the low side of the distribution to a 100,000:1 dynamic range called for in the specification of the flowmeter. At the same time, analog to digital converter 25 must have enough head room so that the 1.2 response of flow meters falling to the high end of the distribution will not cause an over range condition. This combined requirement can be described as a net dynamic range of $(1.2)^2 \times 100{,}000 = 144{,}000$.

Because the flowmeter represented by the preferred embodiment is required to digitize gas flow rates in the range of 1 to 1,000 ml/min with a minimum resolution of 1/100 of the displayed value, and because of the aforementioned precalibration uncertainty of the displacement transducer 17, a minimum dynamic range of 144,000:1 is needed. To achieve this large dynamic range without sacrificing economy and simplicity of implementation, the conversion method described above is employed which, summarily described, produces a numeric representation of the displacement transducer signal which is proportional to the reciprocal of that signal.

It is noted that the selection of the reference integration time Tr is dependent upon several factors. At the minimum end of the range, the value of Tr is bounded by the needed accuracy of the reference charge deposited upon integrator capacitor 53 prior to signal digitization, and also upon realizable timing resolution limits imposed by the band pass characteristics of the integrator amplifier 54. Maximum values for Tr are limited by constraints related to leakage currents and similar analog errors. In the preferred embodiment, the value of three milliseconds has been found to be satisfactory.

In operation, the integrator section of the analog to digital converter 25 is normally placed in the AUTO ZERO mode except during the reference integration time (phase 2) and the deintegration time (phase 3). In a preferred embodiment, the flow sampling interval is 500 milliseconds, and the idle periods during which the integrator section is in the AUTO ZERO mode comprise most of this 500 millisecond flow sampling interval.

The ambient sensor signal sampling period is substantially shorter than that required for the flow rate measurement, and the reference integration time Tr for the sensor signal is chosen in the preferred embodiment to be 1 millisecond. Ambient sensor deintegration times Td typically lie in the order typically from 0–6 milliseconds.

As can be seen in the transducer signal illustrated in FIG. 3, the signal from displacement transducer 17 may have an initial ringing portion at the onset of the measurement process. If desired, this initial ringing portion can be masked by delaying initial operation of the analog to digital converter integration cycle until after the ringing has subsided by using the masking technique disclosed in U.S. patent application Ser. No. 07/827,176 identified above.

The improvement in resolution afforded by the signal processing used in analog to digital converter 25 can be appreciated by examining the rate of change of N as a function of (Sf+Vo), i.e., the rate of change of the measured flow rate signal as a function of the displacement transducer flow rate signal measurement. The magnitude of the derivative of N with respect to this sum increases as the inverse square of the sum. Thus, if the constants of the equation for N=F·Tr·Vr/(Sf+Vo) are adjusted so that flows in the vicinity of 1,000 ml/min are resolved to 10 ml/min, the value of N corresponding to 0.01 ml/min resolution at 1 ml/min need only be 32 (i.e., the approximate square root of 1,000) times larger, not 1,000 times larger. Thus, the 30-fold improvement in ADC resolution over what would be needed if the ADC result were linearly proportional to flow rate has significant importance in reducing the cost and complexity of the analog to digital converter 25.

Figures 4, 4D:
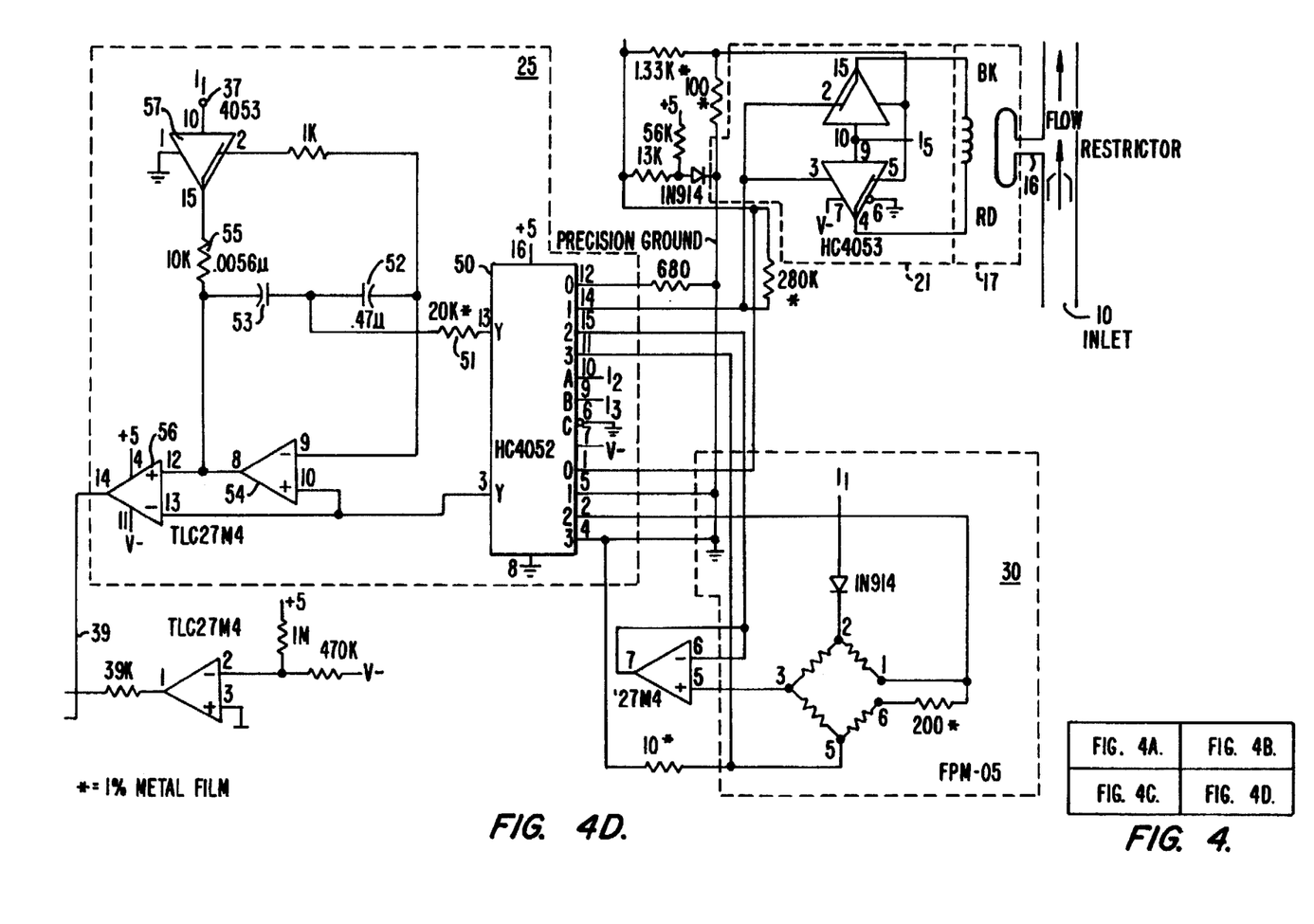
FIG. 4 is a detailed schematic of the preferred embodiment of the invention.
Figure 4A:
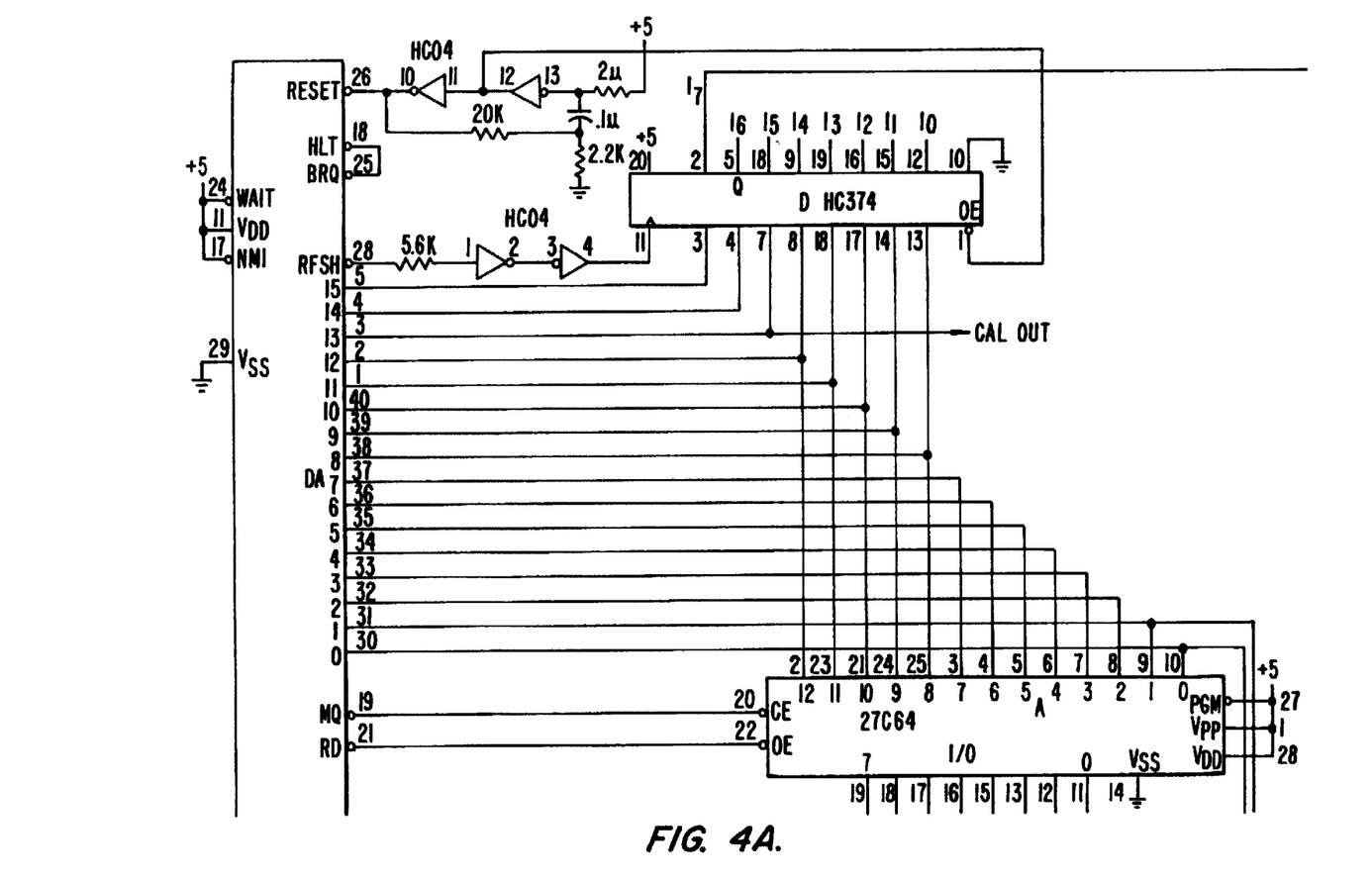
Figure 4B:
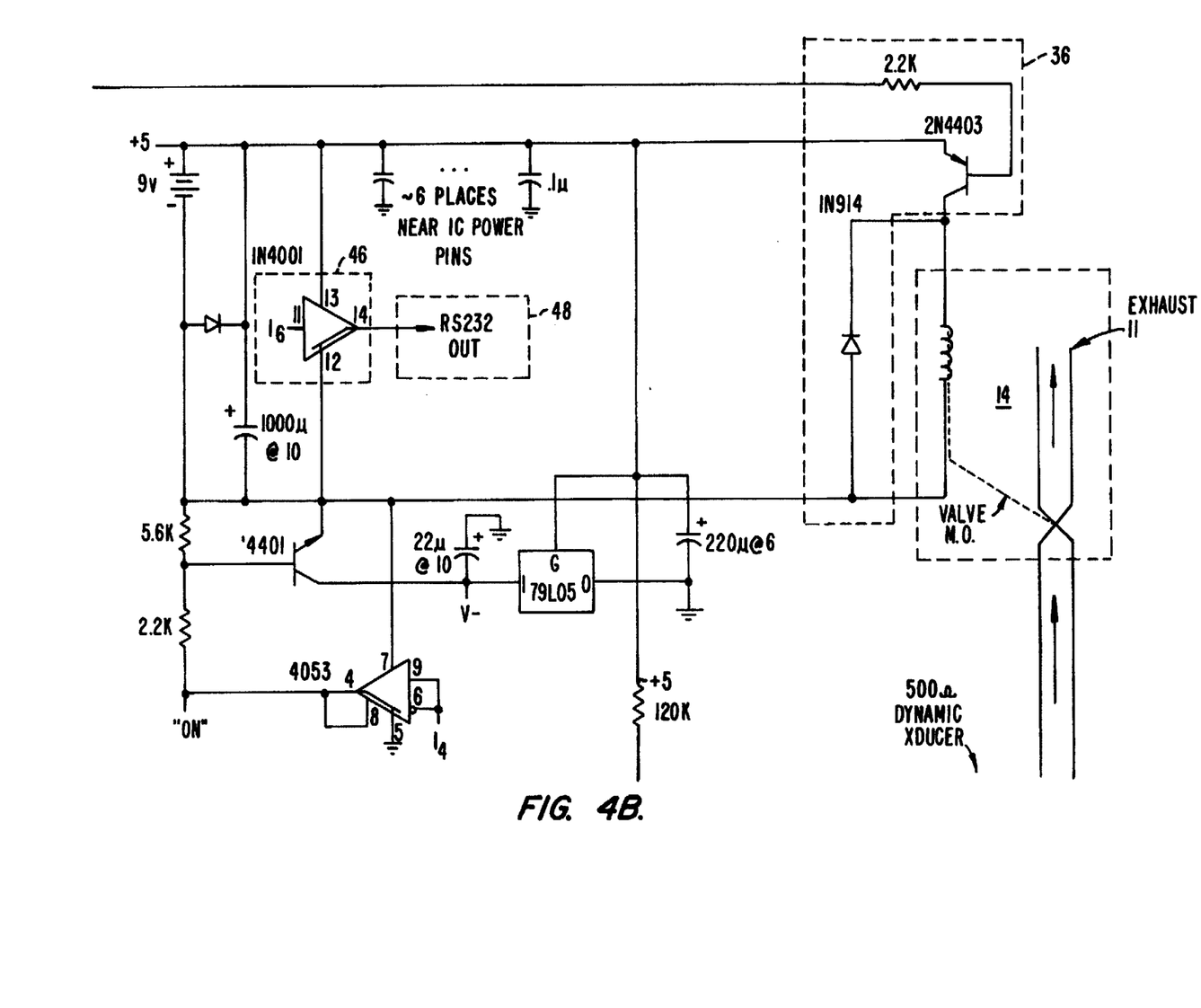
Figure 4C:
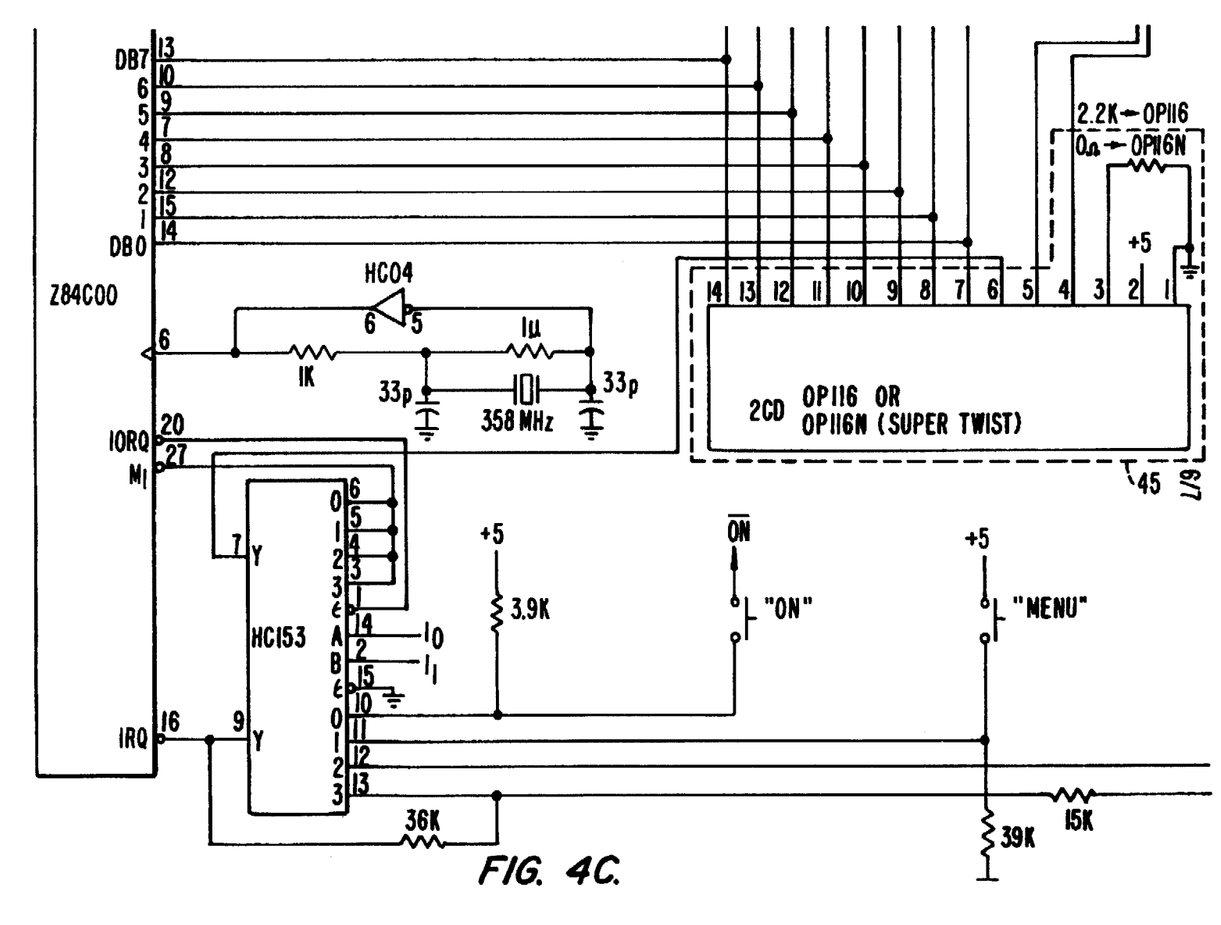

After assembly of the system shown in FIGS. 1, 2 and 4, the system is calibrated in the following manner. To begin the calibration process, the inlet port of a flowmeter under test is connected to a source of an accurately known gas flow, typically 1 L/min. In response, the flowmeter values computed by microcomputer 40 are transmitted via output driver 46 and serial data output terminal 48 to a master computer where the calibration tables are generated. The expression $$N=F \cdot Tr \cdot Vr/(Sf+Vo)$$

can be simplified to $N=A/(V+B)$ where V is the volumetric gas flow rate and A and B are constants to be determined empirically. Given N, this can be arranged as:

$$V=A/N-B$$

The task of compiling a table of these empirical calibration constants is performed by software executing in the computer. Beginning with the N value transmitted by the flowmeter under test while connected to the 1L/min source, and continuing with similar readings taken from an ensemble of accurately predetermined flow sources, including zero flow, the computer compiles a list of flowmeter responses to a number of flows (seven in the case of the preferred embodiment). A set of an equal number of readings is then taken from an ensemble of predetermined flow sinks (for flow in the reverse direction of FIG. 1). Following the sampling of each flow in the ensemble, the computer generates a calibration table consisting of fifty A numerator constants and one B zero offset constant for each flow direction. Interpolation is used to generate those table entries which do not directly correspond to a measured flow value.

The resulting tables, unique to the individual flowmeter under calibration, are merged by the computer with a copy of the flowmeter microprocessor software and written into a programmable read only memory device which subsequently becomes part of the calibrated flowmeter. The calibration information thus becomes indelibly incorporated into the flowmeter product itself.

Also incorporated into the calibration data stored in the prom are constants suitable for standardization of the ambient pressure/temperature sensor. To facilitate this process, the computer is provided by the operator with ambient temperature and barometric pressure data at the beginning of the calibration process. Calibration software executing in the computer correlates ambient sensor ADC results transmitted from the flowmeter with ambient temperature/barometer data to produce a calibration constant for that sensor.

During actual flow measurement, displacement sensor ADC results are converted to corrected volumetric flow data by applying the relation $V=A/N-B$ in conjunction with interpolated A numerator constants from the calibration table and the B zero offset constant.

The resulting volumetric flow values may be directly displayed in units of ml/min, or rescaled for display in a variety of user selected units. Among these units are:

(a) volumetric (ml/min)
(b) mass flow (standard cubic cm/min)
(c) ratio flow (n.nn:1)—a reference flow is first captured by operator command via the operator interface. Subsequent flow measurements are displayed as a ratio to that reference.
(d) linear velocity (m/sec)—the quotient of the volumetric flow divided by the cross-sectional area of any one of a number of silica capillary gauges commonly used for gas chromatography (as selected by the operator from a menu of standard bore gauges) is displayed as a linear velocity. A display of flow so normalized is of benefit to chromatographers during the initial adjustment and setup of gas chromatograph instruments.

Appendix 1 to this specification is an object code program in decimal (base 10) format of the program used in the preferred embodiment. For any given line, the first number is the PROM address, and the second through eleventh numbers are the byte values. Addresses 2304 through 2661 contain the calibration/linearization table unique to that particular flowmeter.

While the above provides a full and complete disclosure of the preferred embodiment of the invention, various modifications, alternate constructions and equivalents may be employed. For example, while specific circuit elements have been described above, other specific elements may be employed, depending on the requirements of a particular application. Therefore, the above description and illustrations should not be construed as limiting the scope of the invention, which is defined by the appended claims.

What is claimed is:

1. In a method of determining the flow rate of a fluid flowing along a path, said method comprising the steps of (a) establishing fluid flow along the path; (b) directing the flow of the fluid to a transducer having a displacement element by restricting the flow path; (c) generating a signal from the transducer representative of displacement due to fluid flow while the flow path is restricted; (d) using the transducer signal to determine the flow rate; and (e) reestablishing fluid flow along the path by removing the restriction; the improvement wherein said step (d) of using includes the steps of:

(i) providing an analog reference signal;
(ii) integrating the analog reference signal for a predetermined time period;
(iii) deintegrating the integrated reference signal with the transducer signal until the value of the deintegration signal reaches a threshold value; and
(iv) using the time required for the deintegration signal to reach the threshold value to calculate the flow rate.

2. The method of claim 1 wherein said threshold value is zero.

3. The method of claim 1 wherein said step (c) of generating includes the step of ignoring an initial portion of the transducer signal representative of a transient condition.

4. The method of claim 1 wherein said step (iv) of using includes the steps of accumulating the time by counting the number N of fundamental sampling periods occurring during said step (iii) of deintegrating, and determining the flow rate from the equation:

$$V=A/N-B$$

where V is the volumetric flow rate and A and B are constants.

5. The method of claim 1 further including the step of providing a temperature correction signal for adjusting the calculated flow rate value.

6. The method of claim 5 wherein said step of providing includes the step of generating first and second sensor signals whose ratio is representative of temperature, integrating the first sensor signal for a second predetermined time period, deintegrating the integrated first signal with the second signal until the value of the integrated first signal reaches a second threshold value, and using the time required for the integrated first signal to reach the second threshold value to calculate the temperature correction signal.

7. A method of claim 6 wherein said second threshold value is zero.

8. An acoustic displacement flowmeter for determining the flow rate of a fluid in a path containing a controllable valve, said flowmeter comprising:

a displacement transducer having a fluid port adapted to be coupled to said fluid path, a displacement element, and a signal output for manifesting a signal representative of movement of said displacement element due to the movement of fluid through said port; and means having an input coupled to said displacement transducer signal output for computing the value of the fluid flow rate, said computing means including means for generating a control signal for enabling the controllable valve to divert fluid between said paths and said fluid port, means for providing an analog reference signal, means for integrating the analog reference signal for a predetermined time period, means for deintegrating the integrated reference signal with the transducer signal until the value of the deintegration signal reaches a threshold value, means for counting the time required for the deintegration signal to reach the threshold value, means for calculating the flow rate from the counted time, and means for terminating the control signal after a predetermined measurement period.

9. The invention of claim 8 wherein said threshold value is zero.

10. The invention of claim 8 wherein said computing means further includes means for calculating a temperature correction signal for adjusting the calculated flow rate value.

11. The invention of claim 10 wherein said temperature correction signal calculating means includes sensor means for providing first and second sensor signals whose ratio is representative of temperature, means for coupling said first sensor signal to said integrating means for a second predetermined time period, means for coupling said second sensor signal to said deintegrating means until the value of the deintegration signal reaches a second threshold value, means for counting the time required for said deintegration signal to reach said second threshold value, and means for calculating the temperature correction signal from the count achieved by said counting means.

12. The invention of claim 11 wherein said second threshold value is zero.

13. The method of claim 1 further including the steps of comparing the polarity of the transducer signal with the polarity of the analog reference signal, and changing the polarity of the transducer signal when the polarities of the transducer signal and the analog reference signal are different.

14. The invention of claim 8 further including means for comparing the polarity of the transducer signal with the polarity of the analog reference signal, and means for changing the polarity of the transducer signal when the polarities of the transducer signal and the analog reference signal are different.

* * * * *